J. F. & R. W. WITTEMANN.
APPARATUS EMPLOYED FOR COMPRESSING FERMENTATION GASES.
APPLICATION FILED AUG. 25, 1911.
1,128,265.
Patented Feb. 9, 1915.
2 SHEETS—SHEET 1.
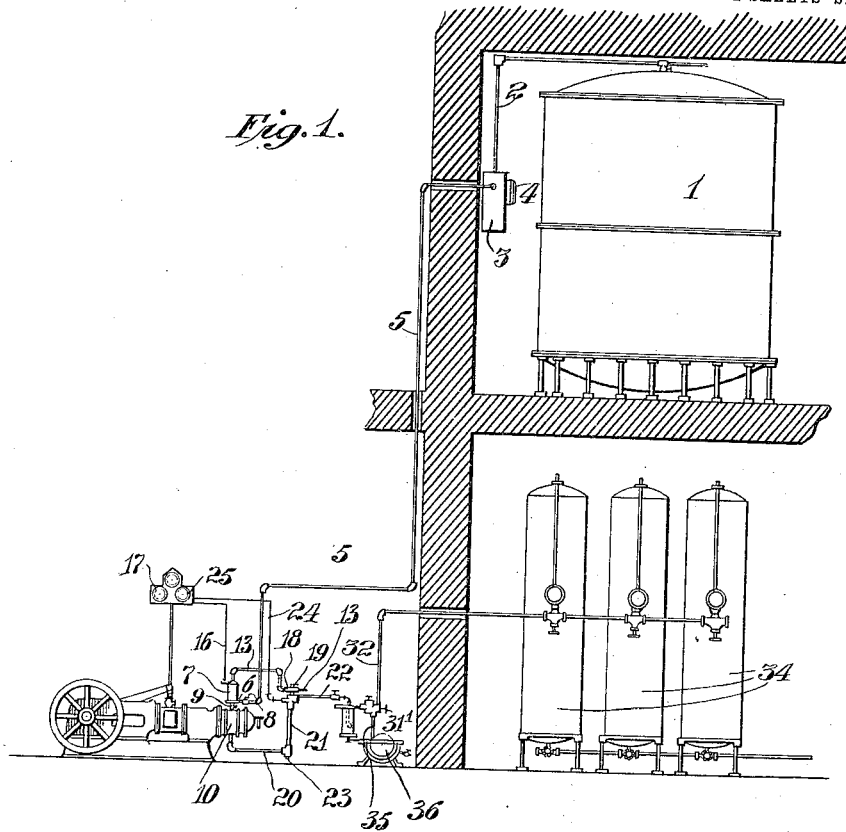
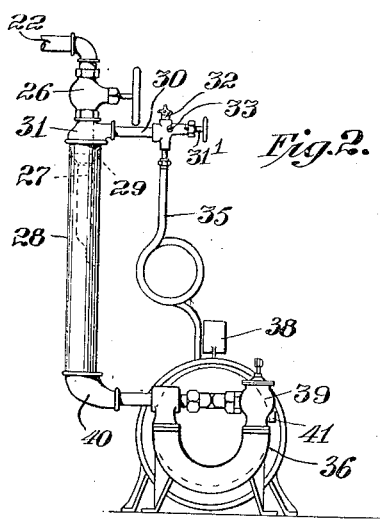
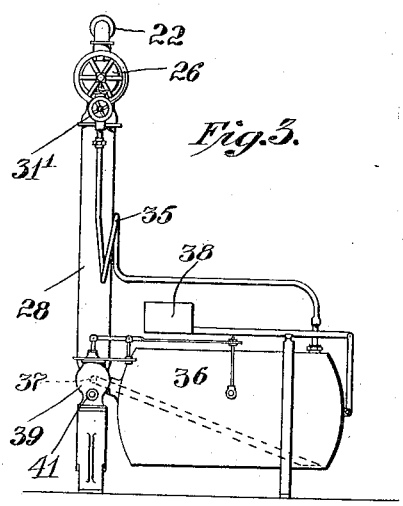

J. F. & R. W. WITTEMANN.
APPARATUS EMPLOYED FOR COMPRESSING FERMENTATION GASES.
APPLICATION FILED AUG. 25, 1911.
1,128,265.
Patented Feb. 9, 1915.
2 SHEETS—SHEET 2.
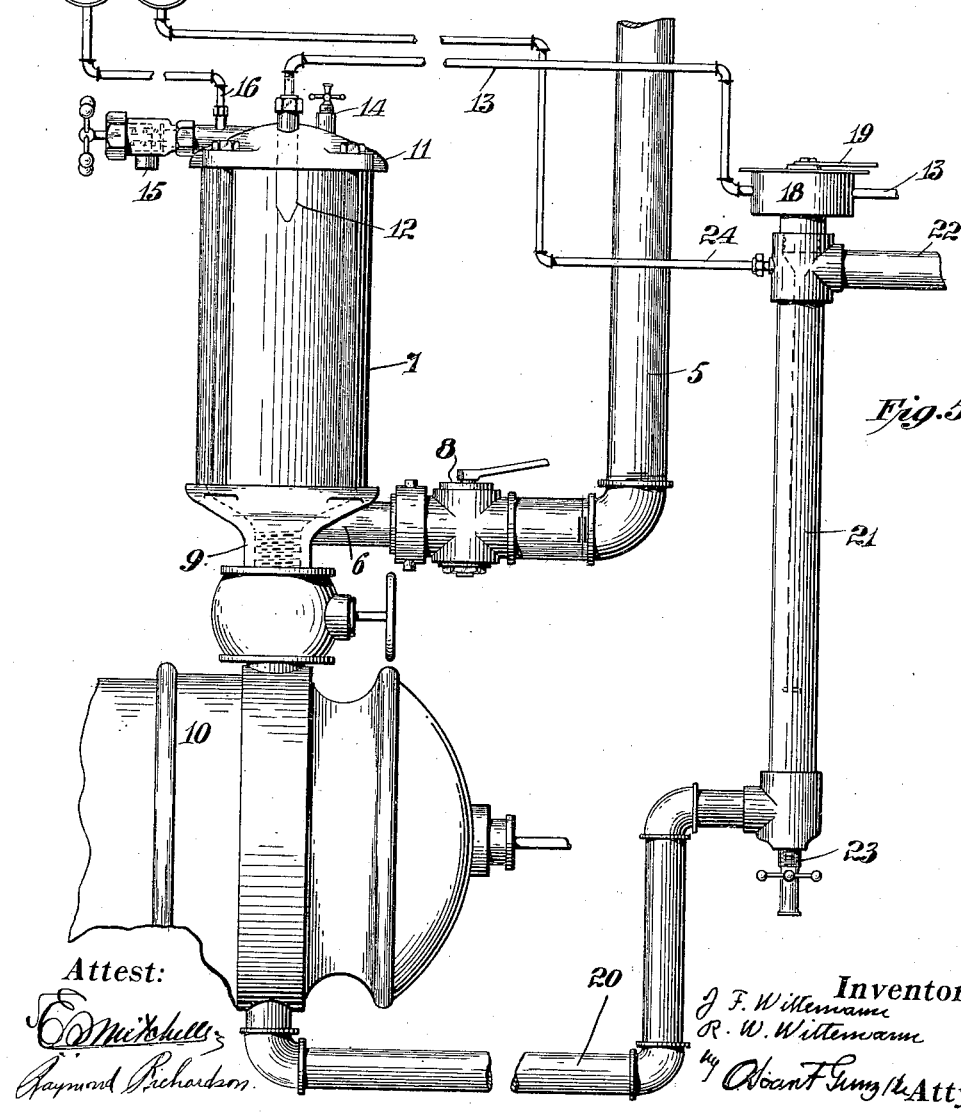

UNITED STATES PATENT OFFICE.

JACOB F. WITTEMANN, OF LAKEWOOD, NEW JERSEY, AND RUDOLPH W. WITTEMANN, OF BROOKLYN, NEW YORK, ASSIGNORS TO AMARANTH MACHINERY AND SUPPLY WORKS, INC., OF NEW YORK, N. Y., A CORPORATION OF NEW YORK.

APPARATUS EMPLOYED FOR COMPRESSING FERMENTATION-GASES.

1,128,265.

Specification of Letters Patent.

Patented Feb. 9, 1915.

Application filed August 25, 1911. Serial No. 645,985.

*To all whom it may concern:*

Be it known that we, JACOB F. WITTEMANN and RUDOLPH W. WITTEMANN, citizens of the United States, and residents of Lakewood, Ocean county, New Jersey, and Brooklyn, Kings county, and State of New York, have invented certain new and useful Improvements in Apparatus Employed for Compressing Fermentation-Gases, of which the following is a specification.

This invention relates to certain new and useful improvements in apparatus employed for compressing fermentation gases, for the utilization of volatile products or gas obtained from the fermentation of beer wort, fruit juices, sugar, and similar concoctions or brews, etc. This gas, which consists essentially of carbonic acid gas, with an appreciable mixture of aromatic and alcoholic vapors, constitutes the means of imparting effervescence, flavor and vivifying characteristics, to the liquid product of such fermentations, mainly beverages, when such fermentation gas is caused to be reabsorbed or mechanically reincorporated with such beverages. Such reabsorption cannot be effected at the time at which the gas is generated, nor in the condition, as to temperature or density, at which the gas is generated, and hence it is collected in its natural condition from such fermentating beverages, preserved and compressed, to a greater or less degree, for the purpose of its convenient storage and for the further purpose of reducing its temperature so as to render it absorbable by such beverages and for the purpose of producing the effervescence, agreeable flavor and taste, in such beverages or for other purposes.

It is the object of our invention to provide an apparatus for so compressing fermentation gas without appreciable risk of impairing its complex nature and its other desirable characteristics.

We have observed during an extending practice of compressing gases obtained from fermented wort with various aparatus, particularly with such as described in U. S. Patent No. 726,487 issued to J. F. Wittemann, Apr. 29, 1903, for method of treating fermentation gas and Patent No. 766,481, issued to J. F. Wittemann, of Aug. 2, 1904, apparatus for treating fermentation gas, by which apparatus such gas was compressed within vertically reciprocating compressors in the presence of a more or less irregular proportion of irregularly refrigerated air free cooling liquid within the compression cylinder, which cooling liquid was returned to such compressors from the receiving tank, into which the compressors discharge, the cooling liquid having been re-cooled more or less, in the interval between its passage from the compressor and its return to the compressor. It still contained more or less heat of the compression and was more or less saturated with free acid vapor, which forms a component part of fermentation gas. Such a return of cooling liquid is fraught with the disadvantage of its becoming increasingly acid, owing to its absorption of acid vapor in the gas, and to its return to the compressors a varying temperature owing to the varying length of time it is subjected to the cooling effect within the receiver, such time varying with the speed of compression, as well as with the quantity of cooling liquid fed into the compressors with the gas. Such quantity of cooling liquid also varies with the varying pressure within the receiver and with the variations in the actual area of hand regulated valves controlling the liquid return. Such variation in the quantity, temperature and degree of impurity in the cooling medium introduced into such gas compressors and commingled with the gas during its compression, naturally results in a variable effect on the gas, during the compression of which heat is generated in proportion to the degree of compression. Such mechanical compression as generally practised in breweries, for instance, varies from between 5 to 250 pounds to the square inch, the speed of such compression also varying greatly. The heat resulting, even at the lowest of such pressures and speeds of compression, will affect such gas very injuriously even though the compressors may be freely cooled outwardly by water jackets. The natural composition, and more particularly its flavor and vivifying constituents of the gas will be destroyed at the higher compression pressure and speeds, even when the compression takes place in the presence of a cooled medium, if the latter is insufficient to neutralize the heat of compression to such a degree and with such regularity that all but a negligible change in such character and flavor is avoided. We have further observed that the negligible amount of air introduced into fermentation gases from cooling water used within the compressors, at about the greatest density of the water (38 to 39° F.), does not noticeably impair the desirable properties of such fermentation gas.

In the accompanying drawings in which like letters of reference indicate like parts in all the figures: Figure 1 is an elevation of our improved gas compressing apparatus. Fig. 2 is an end view of the trap and side view of the liquid eliminator. Fig. 3 is a side view of the parts shown in Fig. 2. Fig. 4 is a side view of a compressor. Fig. 5 is an enlarged detail elevation of the suction chamber and its connection with the compression chamber.

The pressure fermenter 1, of any approved construction, is connected by a tube 2 with a trap 3 having a suitable pressure gage 4. This trap 3 is connected by a gas conduit or tube 5 with the inlet neck 6, at the bottom of a suction chamber 7, which inlet neck is provided with a controlling valve 8. The suction chamber is connected at its bottom by a neck 9 with a horizontal air compressor 10 of any conventional construction. The suction chamber is provided with a cover 11 through which a nozzle 12 projects into the suction chamber and this nozzle is connected with a water feed pipe 13. The cover is further provided with a vent 14, with a safety valve 15 and with a tube 16 leading to a pressure gage 17. With the tube 13 a thermostat valve 18 is connected, which is of any approved construction and which is provided with a conventional indicator or hand 19 for adjustment. The tube 13 is extended beyond this valve 18 and connected with some supply of water under a suitable head, as will be set forth hereinafter.

A tube 20 is connected with the bottom of the compression cylinder of the compressor and contains a thermostat 21 which serves to operate the thermostatic valve 18. A tube 22 leads from the tube 21 to the water eliminator to be described hereinafter. At the bottom of that part of the tube 21 containing the thermostat a drain cock 23 is provided and from the top of this tube a tube 21 extends to a pressure gage 25. The tube 22 is connected with a controlling valve 26, Fig. 2, which in turn is connected with a tube 27 extending into a cylindrical vessel or tube 28, the tube 27 terminating in a semi-coil so as to throw the gas and water, arriving from the compressor, through the pipes 20, 22 and 27 in the form of a spiral jet or stream against the inner surface of said vessel or tube 28. One or more baffle plates 29 are provided in the tube 28 to prevent moisture being carried up with the gas which escapes at the upper end of the tube 28 through the tube 30 connected with the head 31 of the tube 28, and passes through said tube 30 to the valve or cock 31 having a vent 32 and connected by a tube 33 with one or more gas storage vessels 34 having suitable inlet and outlet cocks and pressure gages as shown in Fig. 1. The casing of the valve 31 is connected by a flexible connection 35 with one end of a tilting trap 36 which is pivoted at 37 and held in normal position by the counter weight 38 and which tilting trap controls its outlet valve 39. The bottom of the tube or vessel 28 is connected by a tube 40 with the said tilting trap in such manner that the water from the vessel 28 can pass into the trap.

41 represents a drain or outer discharge opening of the tilting trap.

In operating the form of apparatus shown and described we provide an adequate and uniform source of fermentation gas such as from the fermenters 1 through the conduits described and also an adequate and uniform supply of cooling liquid is provided, preferably clean, soft water from an elevated reservoir or under a practical uniform pressure and refrigerated to as low and regular a temperature, near its greatest density, as can be secured conveniently and economically, so as to insure a uniform supply to the gas compressors under an approximately uniform head and at a practically uniform temperature. The head of such supply is preferably arranged to be greater than that of the gas supply to the suction side of the compressor. Where such is not feasible suitable means are provided for maintaining the required supply of cooling water under regular pressure by means of a liquid pressure regulating device. The regulating device of the thermostat 21 acting on the valve 18 controlling the supply of cooling water to the compression cylinder is so adjusted as to control the cooling water entering the suction channel of the compressor in such a manner as to always feed a sufficient quantity of cooling liquid to it, so that a permissible degree of heat within the discharge pipe 20 of the compression cylinder is never exceeded.

The suction channel of the compressor which establishes communication between the suction chamber and the valves is located horizontally so that the flow of cooling liquid fed into it is evenly divided between the suction valve ports and the compression cylinder. The mixture of gas and water is jointly discharged from the compression cylinder at each piston stroke into the eliminator described and the water settles to the bottom of the chamber or tube 28 and flows into the trap. The flexible connection 35 permits of the tilting of the trap and whenever liquid or water is withdrawn by the gas beyond the baffle plates 29 or into the tube 30 and valve casing 31, it drains back into the trap. When the liquid in the trap is accumulated sufficiently and counter balanced the weight 38, it tilts, opening the drain 41, allowing the water to flow out until the counterweight again closes the valve. The discharge pipe and counterweight are so arranged that the trap tilts back and closes the drain or outlet before the level has entirely receded to the bottom, thereby entraining or trapping the gas and preventing free gas from being discharged.

Having described our invention what we claim as new and desire to secure by Letters Patent is:

1. In an apparatus for the preservation of fermentation gas and its admixtured flavoring substances, the combination with a closed fermenting vessel, of a compressor, a conduit for the gaseous fermentation products, said conduit extending from said fermenting vessel to the compressor, a conduit for conducting cooling liquid to said compressor, a controlling valve interposed in said cooling liquid conduit, a water and gas discharge conduit connected with the compressor, a thermostat extending into said water and gas discharge conduit of said compressor, means for operating the valve in the cooling water supply conduit from the thermostat in the water and gas discharge conduit, means within said discharge conduit for separating the gaseous products from the discharged cooling liquid, a conduit for the said gaseous products leading from above the separating means within the discharge conduit to said gas storage vessel, substantially as set forth.

2. In an apparatus for the preservation of fermentation gas and its admixtured flavoring substances, the combination with a closed fermenting vessel, of a compressor, a conduit for the gaseous fermentation products, said conduit extending from said fermenting vessel to the compressor, a conduit for conducting cooling liquid to said compressor, a controlling valve interposed in said cooling liquid conduit, a water and gas discharge conduit connected with the compressor, a thermostat extending into said water and gas discharge conduit of said compressor, means for operating the valve in the cooling water supply conduit from the thermostat in the water and gas discharge conduit, means within said discharge conduit for separating the gaseous products from the discharged cooling liquid, a conduit for the said gaseous products leading from above the separating means within the discharge conduit to said gas storage vessel and a separate waste connection for the discharge of the cooling water, substantially as set forth.

3. In an apparatus for the preservation of fermentation gas and its admixtured flavoring substances, the combination with a closed fermenting vessel, of a compressor, a conduit for the gaseous fermentation products, said conduit extending from said fermenting vessel to the compressor, a conduit for conducting cooling liquid to said compressor, a controlling valve interposed in said cooling liquid conduit, a water and gas discharge conduit connected with the compressor, a thermostat extending into said water and gas discharge conduit of said compressor, means for operating the valve in the cooling water supply conduit from the thermostat in the water and gas discharge conduit, means within said discharge conduit for separating the gaseous products from the discharged cooling liquid, a conduit for the said gaseous products leading from above the separating means within the discharge conduit to said gas storage vessel, means for automatically discharging from the discharge conduit of the compressor the waste cooling liquid as it accumulates from time to time, substantially as set forth.

Signed at New York city in the county of New York and State of New York, this 26th day of July, A. D. 1911.

JACOB F. WITTEMANN.
RUDOLPH W. WITTEMANN.

Witnesses:
ROSE G. BREEN,
JOHN F. GIFFING.

Copies of this patent may be obtained for five cents each, by addressing the "Commissioner of Patents, Washington, D. C."